2,793,407

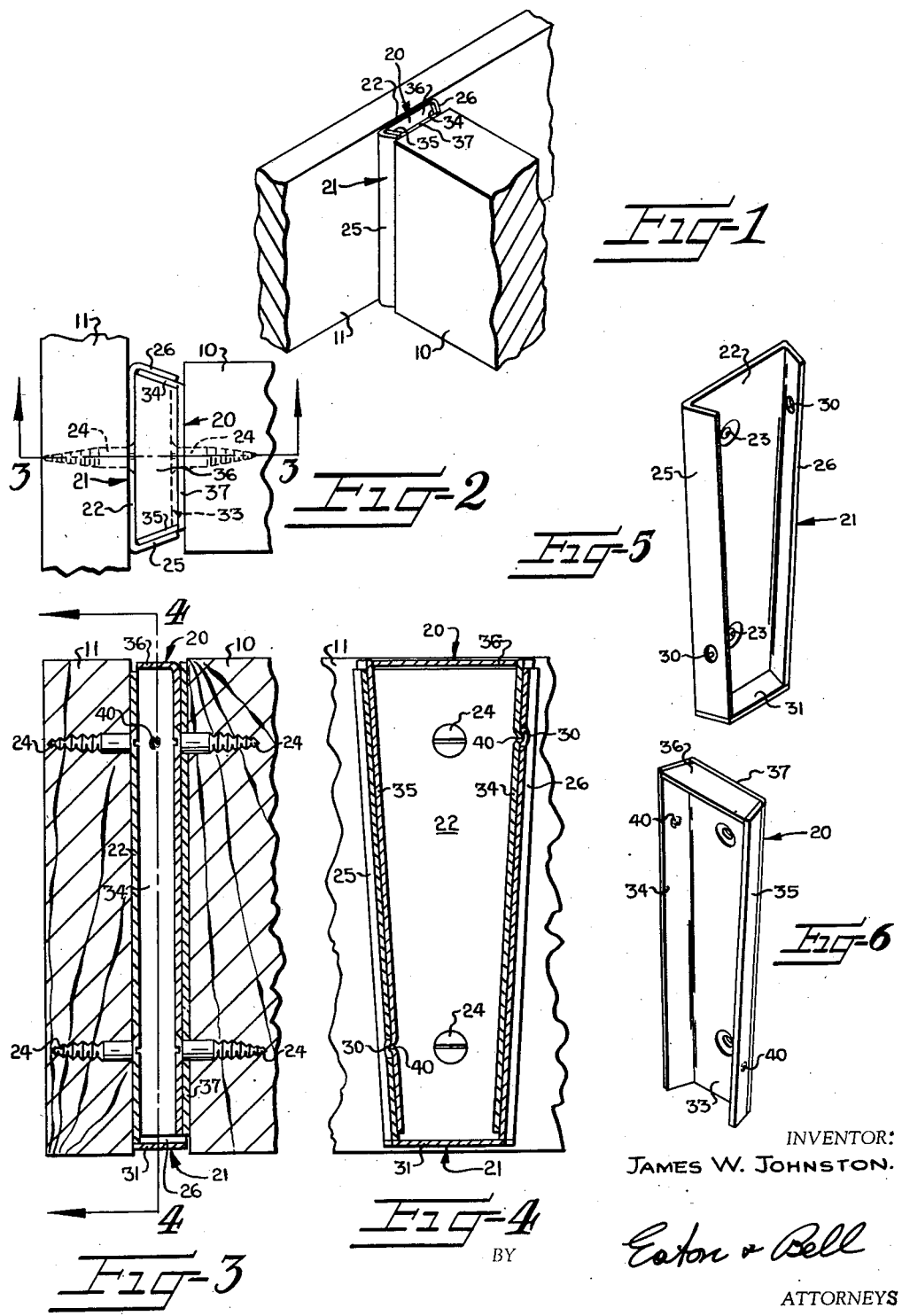
May 28, 1957     J. W. JOHNSTON     2,793,407
INTERLOCKING DOVETAILED CONNECTORS
Filed May 1, 1953
INVENTOR:
JAMES W. JOHNSTON.
BY
ATTORNEYS

United States Patent Office 2,793,407
Patented May 28, 1957

INTERLOCKING DOVETAILED CONNECTORS

James William Johnston, Statesville, N. Dak.

Application May 1, 1953, Serial No. 352,333

1 Claim. (Cl. 20—92.4)

This invention is primarily concerned with means for suspending a first frame member from a second frame member and more especially to an improved dovetailed connector assembly which is particularly adaptable for connecting adjacent structural frame members such as adjacent ends of a portable ladder or camping cot, and is also useful in the construction of furniture, such as chairs, tables, cabinets and the like.

It is an object of this invention to provide an improved dovetailed connector assembly which may be easily and economically constructed, readily assembled and which facilitates readily and very firmly connecting a first frame member in a suspended manner to a second frame member.

More specifically, it is an object of this invention to provide a pair of mating dovetailed members, namely a male dovetailed member and a female dovetailed member, at least one of which is formed from sheet metal or other thin rigid material, and wherein side flanges are provided on the male dovetailed member which project outwardly therefrom, in diverging relation to each other and which flanges are spaced further apart at the upper ends thereof than they are at the lower ends thereof. The female dovetailed member is provided with inwardly converging side flanges thereon which project outwardly therefrom, said flanges also being spaced further apart at their upper ends than at their lower ends so the male dovetailed member may be locked within the female dovetailed member.

It is another object of the present invention to provide a connector of the type described having one or more apertures or openings in the flanges of the female dovetailed member and one or more protuberances or knobs on the outer surface of the flanges of the male dovetailed member adapted to register with the openings in said flanges on the female member, the male member being formed of a material which may be flexed slightly inwardly in the course of its movement into the female dovetailed member and flexed outwardly upon said protuberances registering with said apertures to thus firmly lock the male dovetailed member within the female dovetailed member.

Thus, upon the female dovetailed member being connected to a first structural member and the male dovetailed member being connected to a second structural member, the entire structure, so secured, may be lifted as an integral unit without danger of the individual members being disconnected. On the other hand, when it is desired to disassemble the structure, a quick or jarring tap on the lower surface of the second structural member adjacent the first structural member will cause the flanges of the male dovetailed member to be flexed inwardly as the protuberances on the male dovetailed member are driven upwardly relative to the openings in the flanges of the female dovetailed member and whereupon the second structural member may be readily disconnected from the first structural member.

Some of the objects of the invention having been stated, other objects will appear as the description proceeds, when taken in connection with the accompanying drawings in which—

Figure 1 is an isometric view, with parts broken away, of two adjacent structural members secured together by means of the present invention;

Figure 2 is an enlarged fragmentary plan view of the members shown in Figure 1;

Figure 3 is an enlarged vertical sectional view taken along the line 3—3 in Figure 2;

Figure 4 is a fragmentary vertical sectional view taken along the line 4—4 in Figure 3 and showing the manner in which the protuberances on the flanges of the male dovetailed member project into the apertures provided in the corresponding flanges of the female dovetailed member;

Figure 5 is an isometric view of the female dovetailed member removed from the corresponding structural member;

Figure 6 is an isometric view of the male dovetailed member, also removed from the corresponding structural member.

Referring more specifically to the drawings there will be observed a more or less schematic illustration of two structural elements 10 and 11 which may be elements of any desired type of structure wherein it is desired to firmly but releasably connect adjacent elements. In order to firmly secure the structural element 10 to the structural element 11, the element 10 is provided with a male dovetailed member 20 adapted to fit into and engage a corresponding female dovetailed member 21 secured to the element 11.

It is to be understood that a plurality of mating dovetailed members 20 and 21 may be required to interconnect the component parts of a desired structure and that all of the male dovetailed members utilized in securing together the component structural elements of a desired structure are identical, as are all of the female dovetailed members, and in the interest of simplicity, only the male dovetailed member 20 and the female dovetailed member 21 shown in Figure 1 will be described in detail.

The female dovetailed member 21 secured to the element 11 has a body portion 22, having a plurality of bores 23 therein adapted to be penetrated by screws 24 for securing the member 21 to the element 11. Inwardly and downwardly converging side flanges 25 and 26 are secured to or formed integral with opposite side edges of the body portion 22, which side flanges 25 and 26 project outwardly from the body portion 22 and are spaced further apart at their upper ends than at their lower ends in order that the male dovetailed member 20 may be positioned within the confines of the flanges 25 and 26 of the female dovetailed member 21.

Each of the flanges 25 and 26 of the female dovetailed member 21 is provided with one or more apertures or openings 30, said apertures 30 being preferably positioned in diagonal relation to each other, that is, the aperture 30 in the flange 25 being positioned adjacent the lower end thereof and the aperture 30 in the flange 26 being positioned adjacent the upper end thereof. The female dovetailed member 21 also has an end or bottom wall 31 extending between the lower end edges of the flanges 25 and 26 and serving as a stop for the male dovetailed member.

The male dovetailed member or tongue 20 has a body portion 33, having outwardly and upwardly diverging side flanges 34 and 35 formed integral therewith or secured thereto. An end or top plate 36 is secured to or formed integral with the body 33 and extends between the upper ends of the flanges 34 and 35, said end plate 36 serving to add rigidity to the tongue 20. A wedge-shaped plate 37 is secured to the back of the body portion 33 of the tongue 20 in order to furnish additional rigidity thereto.

Each of the side flanges 34 and 35 of the tongue 20 is provided with one or more protuberances or knobs 40, said knobs 40 extending outwardly from the outer surfaces of each of the flanges 34 and 35 and being adapted to register with the apertures 30 in the flanges 25 and 26 of the female dovetailed member 21.

It is thus seen that as the tongue 20 is slid into position within the confines of the female dovetailed member 21 the knobs 40 will protrude through the apertures 30, thereby firmly locking the tongue 20 within the female dovetailed member 21. In this connection, it should be noted that in the preferred form of the invention one or the other of the dovetailed elements is formed of an inherently flexible material, such as heavy gauge sheet metal or the like, while the other dovetailed element is formed of a more rigid material. Thus, if the tongue 20 is formed of a flexible material such as sheet metal or the like, the flanges 34 and 35 thereof will be flexed inwardly upon the knobs 40 engaging the inner surfaces of the flanges 25 and 26 of the female dovetailed member 21. The flanges 34 and 35 will remain flexed inwardly until the knobs 40 register with the aperture 30 thereby permitting the flanges 34 and 35 of the tongue 20 to resume their normal position for firmly locking the tongue 20 within the female dovetailed member 21.

On the other hand, if it is desired to form the female dovetailed member 21 of flexible material and the tongue 20 of non-flexible material, the flanges 25 and 26 on the member 21 will be flexed outwardly upon the tongue 20 being positioned therebetween. The flanges 25 and 26 will remain flexed outwardly until the knobs 40 on the tongue 20 register with the apertures 30 in the member 21 to thereby permit the flanges 25 and 26 of the member 21 to move inwardly to their normal position for locking the tongue 20 within the confines of the flanges 25 and 26. If desired, both of the dovetailed members 20 and 21 may be formed from flexible material.

It is to be observed that in the preferred form of the invention, as shown and described, the apertures 30 are positioned in diagonal relation to each other, as are the knobs 40. The diagonal relationship of the apertures 30 and knobs 40 permits the tongue 20 to be positioned within the member 21 with a minimum of pressure necessary to flex inwardly the flanges 34 and 35 of the tongue 20, while at the same time requiring a correspondingly greater amount of pressure to withdraw the tongue 20 from the female dovetailed member 21, thus resulting in increased locking strength of the fastening means for the reason that the flex of the flanges 34 and 35 does not take place at the same point. In other words, when withdrawing the tongue 20 from the member 21, it is necessary to flex the flange 34 at a different point than the flange 35, which is more difficult than if it were necessary to flex the flanges 34 and 35 at a single point.

When it is desired to separate the tongue 20 from the element 21, a sharp tap on the under surface of the structural element 10, to which the tongue 20 is secured, will serve to disengage the knobs 40 from the apertures 30, thus unlocking the fastening elements and permitting them to be manually pulled apart.

The locking feature provided by the apertures 30 and the knobs 40 permits the structural elements 10 and 11 to be firmly secured together so that they may be picked up as an integral unit, and there is no danger of them becoming disengaged, until desired, as they are firmly secured thereto by the locking provision of the improved dovetailed fastening means.

It is thus seen that there is provided an improved dovetailed fastening assembly having locking means incorporated therein, whereby the integral elements of an assembled structure are firmly but detachably interconnected.

In the drawings and specification, there has been set forth a preferred embodiment of the invention and, although specific terms are employed, they are used in a generic and descriptive sense only, and not for purposes of limitation, the scope of the invention being defined in the claim.

I claim:

An improved connector for interconnecting adjacent structural elements of a structure; comprising a truncated V-shaped female dovetailed connector secured to a first structural element, said female dovetailed connector having a body portion and inwardly converging side flanges on two opposed edges thereof, each of said side flanges having an aperture therein, the apertures in said side flanges being staggered relative to each other, a correspondingly-shaped tongue secured to a second structural element and adapted to slidably engage said female dovetailed connector, said tongue having a body portion and outwardly diverging flanges on two opposed side edges of said body portion formed of normally rigid but flexible material, and each of said flanges on said tongue having an outwardly projecting knob thereon receivable in the aperture in the corresponding flange on said female dovetailed connector when the tongue is fully positioned in the female dovetailed connector.

References Cited in the file of this patent

UNITED STATES PATENTS

| | | |
|---|---|---|
| 593,330 | Neff | Nov. 9, 1897 |
| 1,182,610 | Wiesman | May 9, 1916 |
| 1,265,113 | Reimer et al. | May 7, 1918 |
| 2,457,002 | Spiro | Dec. 21, 1948 |

FOREIGN PATENTS

| | | |
|---|---|---|
| 130,911 | Great Britain | Mar. 31, 1919 |
| 467,566 | Germany | Sept. 27, 1927 |